2,822,379

ALLOPHANATES OF α-ETHYNYLCARBINOLS

Walter Grimme, Utfort-Moers, and Hans Emde, Homberg, Niederrhein, Germany, assignors to Rheinpreussen Aktiengesellschaft fuer Bergbau und Chemie, Homberg, Niederrhein, Germany, a German corporation No Drawing. Application September 10, 1954
Serial No. 455,352

Claims priority, application Germany September 14, 1953

5 Claims. (Cl. 260—482)

This invention relates to and has as its object new methods of preparing allophanates of α-ethynylcarbinols, which have been found to constitute excellent hypnotic and anticonvulsion agents with low toxicity, and which have pharmaceutical properties far superior to those of the free α-ethynylcarbinols.

It is known that benzyl allophanate and α-ethylbenzyl allophanate have an anticonvulsant and sleep-producing action. Ethynylcarbinols have also been recommended as sedatives.

It has been found that allophanates of α-ethynylcarbinols of the general formula:

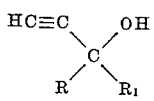

in which R and R₁ are saturated aliphatic hydrocarbon radicals containing from 1 to 6 carbon atoms or the group R—C—R₁ is a cycloaliphatic radical with 5 or 6 carbon atoms, constitute excellent hypnotic and anticonvulsion agents with low toxicity. The pharmaceutical properties of these allophanates are far superior to those of the free α-ethynylcarbinols. R and R₁ may be for example methyl, ethyl, propyl, isopropyl, butyl, sec.butyl, isobutyl, amyl or hexyl groups. The cycloaliphatic radical R—C—R₁ may be a cyclopentyliden

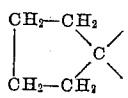

or a cyclohexyliden radical

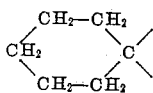

It is known to produce allophanates of α-ethynylcarbinols by reacting the corresponding acetylenic alcohol with carbamyl chloride, allophanyl chloride, or cyanic acid (see Herbert W. Blohm and Ernest J. Becker, Chemical Reviews, volume 51, annual set 1952, pages 471–504). It is also known to produce allophanates by reacting esters of carbamic acid with phosgen, thionyl chloride, sulphuryl chloride or phosphorous pentoxide as well as by ammonolysis of triacylamides or of esters of carboxylated isocyanic acids as well as by hydrolysis of esters of mono- or dicarboxylated cyanamides. These known methods of preparing allophanates have, in general, the disadvantage to give only small amounts of the desired allophanates. Under these known methods, the reactions of α-ethynyl carbinols with carbamyl chloride or allophanyl chloride have proved to be the most practicable methods of producing these allophanates.

But these reactions give likewise no satisfactory yields which may be traced back to the fact that the α-ethynyl carbinols easily react with the freed hydrogen chloride under formation of the corresponding chlorides. This may be explained as follows: The reaction mechanism, when using, for example, allophanyl chloride, proceeds in the following manner:

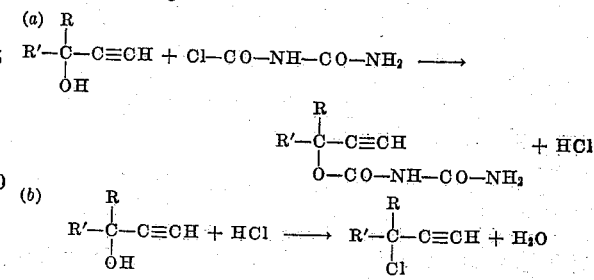

As may be noted from Reaction a, hydrogen chloride is produced in the formation of the allophanate. This hydrogen chloride, as may be noted from Reaction b, will react with the starting α-acetylene carbinol to produce the corresponding chloride. A certain quantity of the starting α-ethynylcarbinol is thus converted into the chloride and lost for the formation of the allophanate, thus decreasing the yield. Further, in the reaction of the alcohol with the hydrogen chloride (Reaction b), water is formed which has a hydrolyzing action on the starting allophanyl or carbamyl chloride. The total result is that both starting substances are removed from main reaction by these side reactions. Furthermore, the hydrogen chloride formed may also attack the acetylenic bond of the starting alcohol, and thus lead to an additional loss of this component. Because of these side reactions, the best yields which may be obtained are between 20 and 30% of the theoretical yield of the allophanates.

In order to suppress the deleterious effect of the hydrogen chloride formed, the ethynylcarbinols are used, according to the invention, in the form of their alkali alcoholates. These alkali alcoholates may be prepared by reacting the ethynylcarbinols with sodium or potassium amide. The alcoholates are then reacted in the same manner as the alcohols with the carbamyl chloride or allophanyl chloride to give the desired allophanates. This reaction has the advantage that instead of hydrogen chloride alkali metal chlorides are formed.

Although the deleterious effects of the hydrogen chloride formed are eliminated by using the alkali alcoholates of the α-ethynylcarbinols, this process is undoubtedly complicated by the necessity of previously preparing the alkali alcoholates. In accordance with a preferred embodiment of the invention, it has further been found that these undesirable side reactions may be suppressed by adding an anhydrous alkali or earth alkali carbonate, and preferably calcium carbonate, to the reaction mixture. The expression "earth alkali" shall include magnesium. The hydrogen chloride produced is neutralized by the carbonate with the formation of carbon dioxide. The carbonates will not react with the sensitive carbamyl or allophanyl chloride at room temperature in the solvents used for the reaction. This is in direct contrast to tertiary bases such as pyridine, conventionally used in acylation reactions for binding the hydrogen chloride, which, if used in the instant reaction, would result in a substantially smaller yield of the allophanate. Similarly, the use of hydroxides and bicarbonates is unsuitable, due to the formation of water which takes place, and the resulting hydrolysis of the carbamyl or allophanyl chlorides. A further advantage in the use of the anhydrous alkali or earth alkali carbonates resides in the fact that the reaction may be carried out in reaction vessels which are not corrosion-proof, such as iron vessels, without any substantial corrosion occurring. Depending on the mol ratios used, the α-acetylene carbinol may be extensively converted into the allophanate, and the reaction may be effected without external cooling. From equimolecular quantities of the α-acetylene carbinol the allophanyl chloride and the alkali or earth alkali carbonate in an inert solvent, such as diisopropyl ether, there is obtained between 46 and 70% of the theoretical yield of the allophanate. It is furthermore possible to recover from the filtrate of these preparations the unreacted α-ethynyl carbinol practically quantitatively, and to use it again for the next batches. When using in excess of 0.5–1.0 mol of allophanyl chloride, the allophanate yield can be increased to 80% of the theoretical yield.

When carbamyl chloride (urea chloride) is used as the starting product, 2 molecules of the carbamyl chloride combine to form allophanyl chloride, giving off hydrogen chloride in accordance with the following equation:

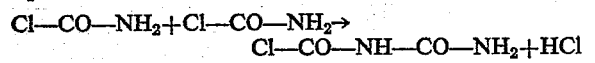

The reactions may be effected at temperatures between 0° C. and 80° C., preferably 0° C. and 45° C. The pressures used are lying between atmospheric pressure and pressures of approximately 20 atmospheres. The use of higher pressures than 20 atmospheres offers no advantage. Upon one mol of the α-ethynyl carbinol, 0.5 to 2 mols of allophanyl chloride or 1 to 4 mols of carbamyl chloride may be used. The use of equivalent amounts of the reactants is preferred. Suitable solvents in which the reactions may be effected are, in general, those of indifferent character which do not contain any hydroxy group, for example aromatic hydrocarbons such as benzene, toluene, xylene; ethers such as diethyl ether, di-isopropyl ether, methyl-propyl ether, dioxane; halogenated aliphatic hydrocarbons such as chloroform, ethylene chloride, methylene chloride or carbon tetrachloride. Glacial acetic acid, however, may also be used as solvent. The quantity of the solvents used may vary in large ranges. In general, the quantity of the solvent should be sufficient to get a homogeneous solution of the α-ethynyl carbinol in the solvent used. But it is also possible to carry out the reactions in suspension or by using a surplus of the solvent. The amount of the alkali or earth alkali carbonates are dependent on the nature of the chloride used. Upon one mol of allophanyl chloride, 0.5 to 1 mol of the aforenamed carbonates are used. When using carbamyl chloride, 1 to 2 mols of alkali or earth alkali carbonates are necessary. Suitable carbonates are: anhydrous sodium carbonate, anhydrous potassium carbonate, calcium carbonate, magnesium carbonate.

The following examples are given by way of illustration and not limitation:

EXAMPLE 1

90.5 grams 1-ethynylcyclohexanol are dissolved in 100 cc. absolute ether and a suspension of 28 grams sodium amide at 100 cc. dry toluene is added with stirring. The suspension of sodium alcoholate thus produced is added drop by drop at −5° C. to 65 grams carbamyl chloride. After 2 hours, water is added to the reaction mixture and the precipitate formed filtered off by suction. After washing with water and recrystallization from methyl alcohol, it gives the 1-ethynylcyclohexyl-allophanate of a melting point of 186–187° C.

EXAMPLE 2

122 grams (1 mol) allophanyl chloride are suspended in 200 cc. dioxane and 69 grams (0.5 mol) of powdered anhydrous potassium carbonate are added. 124 grams (1 mol) 1-ethynylcyclohexanol dissolved at 50 cc. dioxane is added drop by drop over the course of 1 hour at 0–5° C. with stirring. After stirring for a further 10 hours at room temperature, suction filtering is effected, and the residue suspended in 500 cc. of water is acidified with hydrochloric acid. After the filtering and washing with water until a neutral reaction is obtained, the air-dried crude product is recrystallized from methyl alcohol. The yield obtained is 116 grams, i. e., 55% of a theoretical yield, 1-ethynylcyclohexylallophanate of a melting point of 190–191° C.

EXAMPLE 3

To a mixture of 122 grams (1 mol) allophanyl chloride, 53 grams (0.5 mol) dry sodium carbonate, and 350 cc. diisopropyl ether, there is added drop by drop with stirring and at room temperature within 50 minutes a solution of 124 grams (1 mol) 1-ethynylcyclohexanol and 150 cc. diisopropyl ether. Stirring is continued for a further 10 hours followed by suction filtering. The residue is then suspended in an ample quantity of water and acidified with hydrochloric acid. After filtration, washing with aqueous ammonia and water until a neutral reaction is obtained, there is obtained by recrystallization from isopropanol, 106 grams (=50.5% of the theoretical yield) 1-ethynylcyclohexylallophanate of a melting point of 189–190° C.

EXAMPLE 4

122 grams (1 mol) allophanyl chloride are suspended in 300 cc. benzene and 42.3 grams (0.5 mol) magnesium carbonate are added. While stirring, a solution of 98 grams (1 mol) 3-methylpentyne-1-ol-(3) in 50 cc. benzene is added drop by drop over the course of 30 minutes. After a reaction time of 8 hours at room temperature, there is produced a mass of paste-like consistency which is suction-filtered and suspended in water. After acidification with hydrochloric acid, filtration and washing with water, there are obtained 96 grams of a colorless, crude product. The yield after recrystallization from isopropanol is 84 grams (=45.8% of the theoretical yield) of 3-methylpentyne-1-yl-3-allophanate-(3) of a melting point of 151–152° C.

EXAMPLE 5

To a mixture of 122 grams (1 mol) allophanyl chloride, 99 grams (0.5 mol) barium-carbonate and 400 cc. diisopropylether there is added drop by drop with energetic stirring at room temperature over the course of 40 minutes, a solution of 124 grams (1 mol) 1-ethynyl-cyclohexanol in 150 cc. diisopropyl ether. Filtering is effected followed by washing with diisopropylether, and the residue is stirred into water and acidified with hydrochloric acid to a pH of 2. The crude product obtained by suction-filtering is washed until it gives a neutral reaction and is air-dried. The yield, after recrystallization from isopropanol, is 120 grams (=56.8% of the theoretical yield) of 1-ethynylcyclohexylallophanate of a melting point of 190–191° C.

EXAMPLE 6

1.000 cc. diisopropylether are poured over 411 grams (3.5 mols) powdered allophanyl chloride in an autoclave and 168 grams (1.68 mols) calcium carbonate are added. With strong stirring, a solution of 330 grams (2.75 mols) 1-ethynylcyclohexanol in 200 cc. diisopropylether is added drop by drop over the course of 90 minutes. The temperature increases to 28° C. and the pressure to 5 atmospheres. After 5 hours, filtration is effected followed by washing with 200 cc. diisopropylether. The crystalline mass is suspended in 2.000 cc. water and acidified with hydrochloric acid. After filtration, washing with aqueous ammonia and water, there are obtained 368 grams air-dried crude product of a melting point of 179–182° C. From this by recrystallization from 4.5 liters methyl alcohol, there are obtained 345 grams 1-ethynylcyclohexylallophanate, i. e., 61.5% of the theoretical yield, having a melting point of 189–191° C.

The diisopropylether filtrate contained 108 grams unreacted 1-ethynylcyclohexanol, which was computed by titration of nitric acid released by silver nitrate solution. The concentrate obtained upon concentration of this solution in vacuum down to a 1-ethynylcyclohexanol content of 52.8% is added to a mixture of 130 grams (1.7 mols) allophanyl chloride, 80 grams (0.8 mol) calcium carbonate and 300 cc. diisopropylether within 30 minutes with stirring, without external cooling. After a further period of reaction of 5½ hours and the above-described purification, 118 grams 1-ethynyl-cyclo-hexylallophanate, i. e., 65% of the theoretical amount, of a melting point of 189–190° C. were obtained.

EXAMPLE 7

To a mixture of 122 grams (1 mol) allophanyl chloride, 50 grams (0.5 mol) calcium carbonate and 125 cc. chloroform there is added with stirring at room temperature, drop by drop, over the course of 45 minutes, a solution of 84 grams (1 mol) 3-methyl-butyne-1-ol-(3). Thereupon the reaction is continued with stirring for a further five hours. After the working up and recrystallization from methyl alcohol, there are obtained 119 grams 3-methyl-butyn-1-yl-3-allophanate-(3), i. e., 70% of the theoretical yield, of a melting point of 179° C.

An analogous batch without the addition of calcium carbonate gives a yield of 32.9 grams (i. e., 19.3% of the theoretical yield).

EXAMPLE 8

To a mixture of 100 grams (0.83 mol) allophanyl chloride, 100 grams (1 mol) calcium carbonate and 250 cc. diisopropylether, there is added with agitation at room temperature a solution of 62 grams (0.5 mol) 1-ethynyl-cyclohexanol in 50 cc. diisopropylether drop by drop. The working up and purification (see Example 6) leads to 92.7 grams 1-ethynylcyclohexylallophanate (=87.9% of the theoretical yield) of a melting point of 189–191° C.

An analogous batch without calcium carbonate gives 30 grams 1-ethynylcyclohexylallophanate, i. e., 28.6% of the theoretical yield.

EXAMPLE 9

To a mixture of 122 grams (1 mol) allophanyl chloride, 50 grams (0.5 mol) calcium carbonate, and 375 cc. diisopropylether, there is added with strong stirring at room temperature within 30 minutes, a solution of 42 grams (0.5 mol) 3-methylbutyne-1-ol-(3) in 40 cc. diisopropylether. Thereupon stirring is continued for a further 8 hours without external cooling. The working up and purification (see Example 7) results in 67.2 grams (=79% of the theoretical yield) 3-methyl-butyne-1-yl-3-allophanate-(3). Melting point 179° C.

EXAMPLE 10

To a mixture of 79.5 grams (1 mol) carbamyl chloride and 225 cc. diisopropylether, there are added 100 grams (1 mol) calcium carbonate, and thereupon 42 grams (0.5 mol) 3-methyl-butyne-1-ol-(3) dissolved in 75 cc. diisopropylether are added with cooling to 0–5° C. within the course of 1 hour. Thereupon the temperature is allowed to rise with further stirring to about 40° C. and the reaction is interrupted after 6 hours. After the suction-filtering, the residue is suspended in 300 cc. water, acidified with hydrochloric acid, filtered, and washed until a neutral reaction is obtained. The air-dry colorless crude product is recrystallized from methyl alcohol. Yield 52 grams (=61% of the theoretical yield) 3-methylbutyne-1-yl-3-allophanate-(3) of a melting point of 179° C.

A similar batch, which was prepared without the addition of calcium carbonate, gave a yield of 19.8 grams, i. e. 23.3% of the theoretical yield.

EXAMPLE 11

To a mixture of 79.5 grams (1 mol) carbamyl chloride, 225 cc. dry diethylether and 100 grams (1 mol) calcium carbonate, there is added drop by drop over the course of 1 hour with agitation and cooling by ice, a solution of 62 grams (0.5 mol) 1-ethynylcyclohexanol and 75 cc. diethylether. Thereupon the ice bath is removed, and the temperature allowed to rise to 45° C. After 8 hours, the batch was worked up in accordance with Example 5. There are obtained 71 grams (=67.2% of the theoretical yield) 1-ethynylcyclohexylallophanate of a melting point of 189–191° C.

Without addition of calcium carbonate, the other conditions remaining the same, the yield is 26.5 grams or 25.2% of the theoretical yield.

EXAMPLE 12

In a shaking apparatus consisting of a reaction flask and dropping device, 12.25 grams (0.1 mol) allophanyl chloride and 5.0 grams (0.05 mol) calcium carbonate were suspended in 30 cc. diisopropylether, whereupon 6.2 grams (0.05 mol) 1-ethynylcyclohexanol in 7.5 cc. diisopropylether were added in a single batch.

At room temperature there developed with vigorous shaking within the course of 6 hours 864 cc. carbon dioxide corresponding to a 77% yield. After the above described working up, it was possible to obtain 7.4 grams 1-ethynylcyclohexylallophanate (=73.5% of the theoretical yield), 1.15 grams (18.6%) 1-ethynylcyclohexanol were not reacted, as was determined by titration of the diisopropylether filtrate.

EXAMPLE 13

A solution of 56 grams 3,4-dimethyl-pentyne-1-ol-(3) in 50 cc. diisopropyl ether is added drop by drop under stirring at a temperature of 0° to 5° C. over the course of 20 minutes to a suspension of 123 grams allophanyl-chloride and 50 grams calcium carbonate in 325 cc. diisopropyl ether. The mixture is agitated without further cooling for 8 hours so that the temperature gradually increases to 15 to 20° C. After standing over night, the reaction mixture is suction-filtered, the residue is suspended in 300 cc. water, acidified with hydrochloric acid and the crude 3,4-dimethyl-pentyne-1-yl-allophanate-(3) is suction-filtered. After washing with ammonia liquor and drying, the product is recrystallized from isopropyl alcohol. There are obtained 58 grams (=59% of the theoretical yield) 3,4-dimethyl-pentyne-1-yl-allophanate-(3) of a melting point of 146–147° C.

EXAMPLE 14

A mixture of 150 grams powdered potassium hydroxide and 1200 cc. diisopropyl ether is saturated with acetylene with stirring at a pressure of 8 atmospheres in an agitating autoclave for 30 minutes. Before the forcing-in of the acetylene, the autoclave was rinsed out with a stream of nitrogen. Then a solution of 80 grams cyclopentanone in 50 cc. of diisopropyl ether are forced in under a nitrogen pressure of 15 atmospheres within a period of 30 minutes and the mixture is agitated for another four hours. After releasing this pressure, the reaction mass was split into layers with water and the ethereal layer was dried over solid potassium carbonate and distilled. At normal pressure, the fraction 152°–156° C. represents the pure 1-ethynyl-cyclopentanol.

A solution of 25 grams of 1-ethynyl-cyclopentanol in 30 cc. diisopropyl ether are dropped under vigorous agitating at room temperature within a period of 30 minutes to a mixture of 54 grams allophanyl chloride, 22 grams calcium carbonate and 175 cc. diisopropyl ether. After agitating at room temperature for 10 hours, the reaction mixture was filtered and the residue was washed with diisopropyl ether. Then the residue was suspended in 200 cc. water, acidified with hydrochloric acid to a pH-value of 2–3, suction-filtered and washed with water. After drying and recrystallizing from isopropanol, there were obtained 29 grams (=65% of the theoretical yield)

pure 1-ethynyl-cyclopentylallophanate of a melting point of 176–177° C.

Toxicology

Some allophanates of α-ethynylcarbinols were subjected to toxicological tests on white mice weighing 18–25 grams. The substances were dissolved in oil or suspended in polyethylene derivatives of sorbitan monooleate, a non-ionic surface-active agent and applicated orally. As opposed to the starting acetylenic alcohols, their allophanates proved to be largely non-toxic. For example, 1-ethynyl-cyclohexanol has a $DL_{50}$ of 0.825 gram per kilogram of mouse, while the corresponding allophanate has a $DL_{50}$ of about 7.5 grams per kilogram of mouse. Further figures are given in the following Table I.

TABLE I

[$DL_{50}$ (mice, orally)]

|   | alcohol, g. | allophanate |
|---|---|---|
| 3-methylbutyne-1-ol-(3) | 1.8 | 2.5 g./kg. mouse. |
| 3-methyl-pentyne-1-ol-(3) | 0.785 | 0.875 g./kg. mouse. |
| 1-ethynylcyclohexanol | 0.825 | approx. 7.5 g./kg. mouse. |

Pharmacological tests

Initial tests of α-ethynylcarbinols and their allophanates in the fish test according to Pfeiffer and Häusler (Archiv für Exp. Path. u. Pharmakol. vol. 215, p. 413 (1952)) showed that the esters generally had at least the effect of the original alcohol, but that in most cases they were many times more effective than the corresponding alcohols. The substances were dissolved in water and tested on fish. The figures of the following Table II give the lowest concentrations at which the tested fish showed central paralytic phenomena. These phenomena become perceptible by retarded eye reaction.

TABLE II

|   | alcohol | allophanate |
|---|---|---|
| 3-methyl-butyne-1-ol-(3) | 1:500 |   |
| 3-methyl-pentyne-1-ol-(3) | 1:1,000–1:3,000 | 1:5,000 |
| 1-ethynyl cyclohexanol | 1:20,000 | 1:50,000 |

Further tests were carried out regarding the sedative action of the substances. These tests were run on white mice in a vibrating cage according to Straub. It was found that 1-ethynyl-cyclohexylallophanate-(1) was an excellent sedative. In a semi-chronic feed test on rats and guinea pigs, the 1-ethynyl-cyclohexylallophanate showed no toxic effects upon the hematopoietic system.

On the base of clinical experience, the influence of 1-ethynylcyclohexylallophanate on the toxicity of adrenalin and other sympathiocomimetics was investigated. It was found, for example, that the lethality of toxic doses of adrenalin applicated intravenously could be reduced by 50% and more.

Hitherto existing clinical experience indicates that the 1-ethynyl-cyclohexylallophanate-(1) is a useful remedy to induce sleep. Its particular importance is based on its sedative action and represents an excellent sedative for daylight use. It is especially suitable for the premedication of operations in odontology, such as extractions, resections and the enucleation of cysts. Here it will soothe the patient, prevent fainting and normalize any acceleration of pulse as may be caused by the use of vasoconstringents.

We claim:

1. Process for the preparation of allophanates of tertiary α-ethynyl alcohols which comprises contacting an ethynyl alcohol with a member selected from the group consisting of carbamyl chloride and allophanyl chloride at a temperature ranging from about 0 to 80° C. in the presence of an inert organic solvent substantially free from hydroxyl groups and a member selected from the group consisting of anhydrous alkali and alkali earth carbonates, and recovering the allophanate formed.

2. Process according to claim 1 in which said contacting is effected in the presence of calcium carbonate.

3. Process according to claim 1 in which said contacting is effected at a temperature between about 0 to 45° C. and pressure ranging from about normal to 20 atmospheres gauge.

4. Process according to claim 3 in which said contacting is effected with a substantially equal molecular quantity of said ethynyl alcohol and such first mentioned group member.

5. Process according to claim 1 in which said second mentioned group member is present in amount of about ½ to 2 mols, per mol of said first mentioned group member.

References Cited in the file of this patent

Blohm et al.: Chem. Reviews 51 (1952), 471–504.
Groggins: Organic Synthesis, 4th ed. (1952), p. 598.